(12) United States Patent
Spreutels

(10) Patent No.: US 12,741,822 B2
(45) Date of Patent: Sep. 22, 2026

(54) SYSTEM AND METHOD FOR DETERMINING THE STABILITY OF AN OBJECT BEING TRANSPORTED ON A CONVEYOR SYSTEM

(71) Applicant: Deutsche Post AG, Bonn (DE)

(72) Inventor: Jenson Spreutels, Meerbeek (BE)

(73) Assignee: Deutsche Post AG, Bonn (DE)

( * ) Notice: Subject to any disclaimer, the term of this patent is extended or adjusted under 35 U.S.C. 154(b) by 381 days.

(21) Appl. No.: 18/454,150

(22) Filed: Aug. 23, 2023

(65) Prior Publication Data

US 2024/0067457 A1 Feb. 29, 2024

(30) Foreign Application Priority Data

Aug. 31, 2022 (EP) .................................... 22193293

(51) Int. Cl.
*B65G 43/08* (2006.01)
*G06T 7/246* (2017.01)
*G06T 7/269* (2017.01)

(52) U.S. Cl.
CPC .............. *B65G 43/08* (2013.01); *G06T 7/248* (2017.01); *G06T 7/269* (2017.01); *B65G 2203/0233* (2013.01); *B65G 2203/041* (2013.01); *G06T 2207/10016* (2013.01)

(58) Field of Classification Search
USPC .......................................................... 382/103
See application file for complete search history.

(56) References Cited

U.S. PATENT DOCUMENTS

2014/0341474 A1 11/2014 Dollar et al.
2016/0052764 A1* 2/2016 Führer .................... B67C 3/007 348/143
2018/0047171 A1 2/2018 Chen et al.
2018/0084719 A1* 3/2018 Neitemeier ............... G01F 1/06
(Continued)

FOREIGN PATENT DOCUMENTS

CN 105492862 A 4/2016
CN 108696675 A 10/2018
(Continued)

OTHER PUBLICATIONS

European Search Report for Application No. EP 22193193.2, dated Mar. 17, 2023, 7 pages.
(Continued)

*Primary Examiner* — Chineyere Wills-Burns
*Assistant Examiner* — Aaron Timothy Bonansinga
(74) *Attorney, Agent, or Firm* — Dority & Manning, P.A.

(57) ABSTRACT

A computer implemented method for determining the stability of an object being transported on a conveyor system in which the conveyor system includes a carrier configured to transport the object in a transport direction of the conveyor system includes the steps of receiving a series of images representing the object on the carrier being transported by the conveyor system, determining a moving direction of the object in the received series of images, and determining the stability of the object by comparing the determined moving direction of the object to the transport direction of the conveyor system. Furthermore, a system includes a control unit configured to perform the above method and a camera.

14 Claims, 3 Drawing Sheets

(56) References Cited

U.S. PATENT DOCUMENTS

Figure 1:
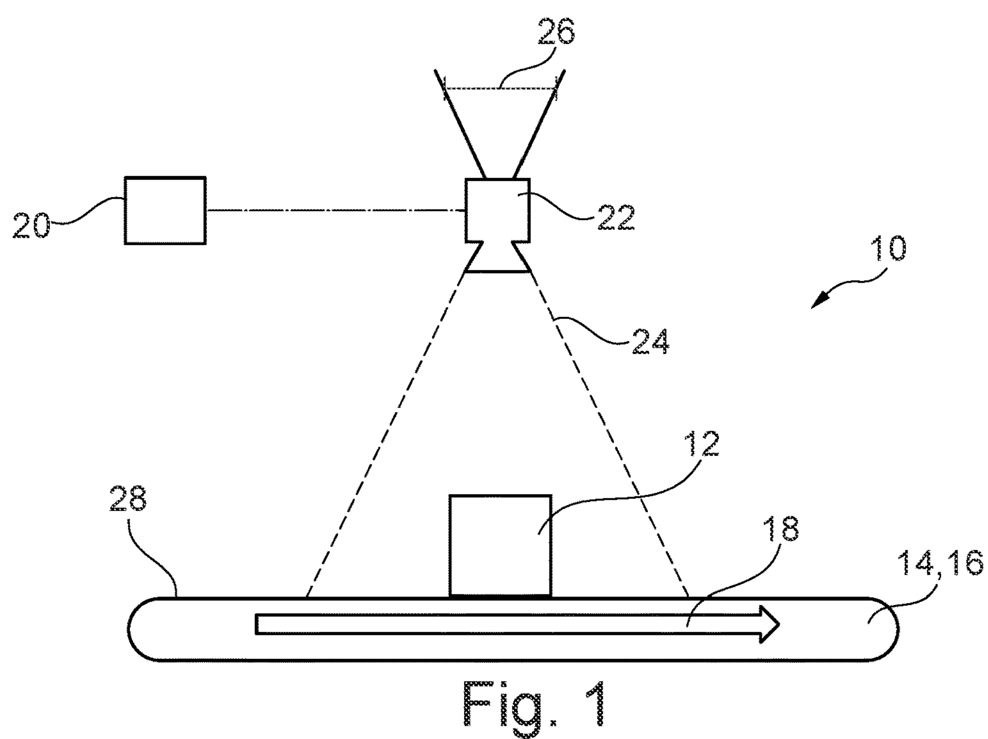

| | | | | |
|---|---|---|---|---|
| 2019/0155264 | A1* | 5/2019 | Enssle | G05B 19/4189 |
| 2019/0344971 | A1* | 11/2019 | Smit | B65G 47/2445 |
| 2020/0031593 | A1* | 1/2020 | Usami | B25J 9/0093 |
| 2020/0130939 | A1* | 4/2020 | Davies | B65G 21/12 |
| 2021/0009359 | A1* | 1/2021 | Polak | G06T 7/13 |
| 2021/0118154 | A1* | 4/2021 | Oberpriller | G06T 7/285 |
| 2021/0182570 | A1* | 6/2021 | Olmstead | G07G 1/0045 |
| 2021/0350496 | A1* | 11/2021 | Carey | G06T 1/0014 |
| 2021/0354926 | A1* | 11/2021 | Makhal | G06N 3/09 |
| 2022/0113708 | A1* | 4/2022 | Scherzer | G06V 10/28 |
| 2023/0159280 | A1* | 5/2023 | German | B65G 43/10<br>198/781.06 |
| 2023/0192418 | A1* | 6/2023 | Horowitz | B65G 47/46<br>198/349 |
| 2025/0131551 | A1* | 4/2025 | Adam | G06V 20/66 |

FOREIGN PATENT DOCUMENTS

| | | | |
|---|---|---|---|
| CN | 111434592 | A | 7/2020 |
| CN | 113686300 | A | 11/2021 |
| WO | 2018/106104 | A1 | 6/2018 |

OTHER PUBLICATIONS

Office Action (w/ English translation) in corresponding CN Application No. 202311107502.X, dated Dec. 3, 2025, in 14 pgs.

* cited by examiner

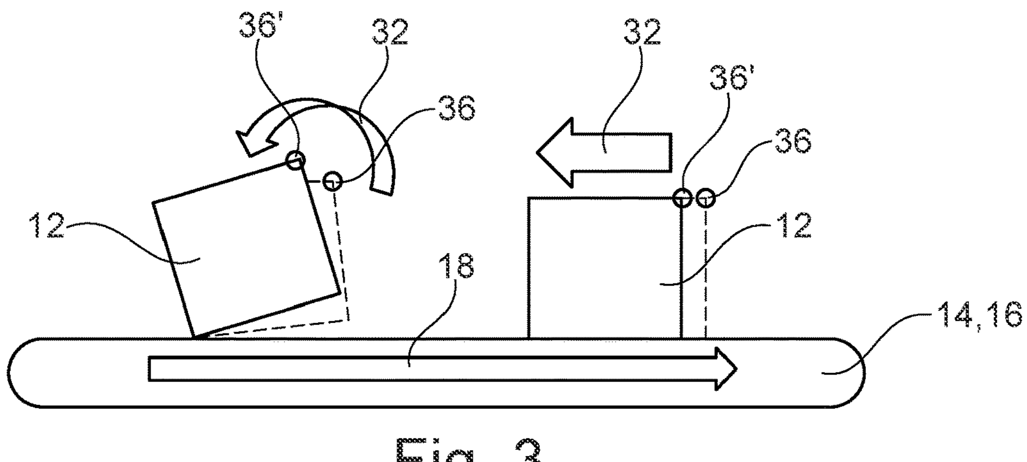
Fig. 3
36
36
36
38
40
42
36"
36"
36"
Fig. 4
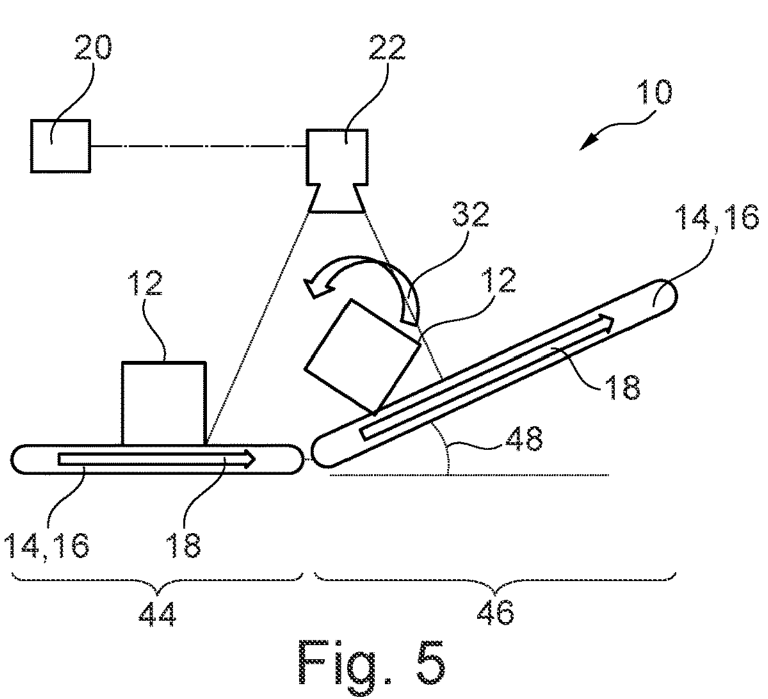
Fig. 5

SYSTEM AND METHOD FOR DETERMINING THE STABILITY OF AN OBJECT BEING TRANSPORTED ON A CONVEYOR SYSTEM

CROSS-REFERENCE TO RELATED APPLICATIONS

The present application is based upon and claims the right of priority to European Patent Application No. 22193293.2, filed on Aug. 31, 2022, the disclosure of which is hereby incorporated by reference herein in its entirety for all purposes.

The invention relates to a method for determining the stability of an object being transported on a conveyor system.

Furthermore, the invention relates to a control unit configured to perform the above method.

Further, the invention relates to a system for determining the stability of an object being transported on a conveyor system comprising the above control unit.

BACKGROUND OF THE INVENTION

With electronic commerce the amount of goods delivered has steadily increased. The goods are mainly moved in highly standardized automatic and semiautomatic procedures using conveyor systems for transporting and sorting of the goods.

When objects of various shapes and sizes move along a conveyor system, it is imperative that the objects continue to move, in order not to create potential delays or damage due to a jam. When a jam occurs, often employees have to resort to mechanical tools, such as jam break poles, to manually unjam the conveyor system. Unfortunately, when employees use these sorts of tools, safety issues or product damage can often result. Furthermore, the conveyor jam can not only lead to product damage but also to downtime, which in turn leads to high costs.

DESCRIPTION OF THE INVENTION

Proceeding from this situation, it is an object of the invention to provide means to decrease the occurrence of conveyor jams, and/or enhance the efficiency of conveyor systems.

The object is achieved by the features of the independent claims. Advantageous embodiments are specified in the dependent claims.

Accordingly, the object is achieved by a computer implemented method for determining the stability of an object being transported on a conveyor system, wherein the conveyor system comprises a carrier configured to transport the object in a transport direction of the conveyor system, comprising the steps of

- receiving a series of images representing the object on the carrier being transported by the conveyor system,
- determining a moving direction of the object in the received series of images, and
- determining the stability of the object by comparing the determined moving direction of the object to the transport direction of the conveyor system.

Furthermore, the object is achieved by a control unit configured to perform the above method.

Also, the object is achieved by a system for determining the stability of an object transported on a conveyor system comprising the above control unit and a camera, wherein the camera is communicationally connected to the control unit, configured to capture a series of images representing the object on the carrier being transported by the conveyor system, and configured to send the captured images to the control unit.

By determining the stability of the objects, it is possible to identify unstable objects before they cause a conveyor jam. Hence, once the unstable objects are known, countermeasures—such as removing the unstable objects from the conveyor system—can be taken to avoid conveyor jams, thus decreasing the occurrence of conveyor jams and/or enhancing the efficiency of the conveyor system.

One aspect of the invention is, that the stability of the object is determined by comparing the determined moving direction of the object to the transport direction of the conveyor system. In other words, the moving direction of the object and the transport direction of the conveyor system are compared to each other in order to determine the stability of the object. Preferably the determination of the stability of the object is independent of a moving velocity of the object and/or of a change of the moving velocity of the object.

The conveyor system comprises the carrier configured to transport the object in the transport direction of the conveyor system. The object is preferably transported by the conveyor system by movement of the carrier along the transport direction, and further preferably by being placed on the carrier and being moved by the movement of the carrier in the transport direction. Further preferably the carrier moves along the transport direction.

Furthermore, the conveyor system may be configured as belt conveyor system, chain conveyor system, roller conveyor system, or cross belt sorter. Preferably the conveyor system is configured as belt conveyor system, wherein further preferably the carrier is configured as conveyor belt. The object can in principle be any object. However, preferably the object comprises a package, a parcel, a box, a mailing bag, and/or a packaging container.

In one step of the method, the series of images representing the object on the carrier being transported by the conveyor system is received, preferably by the control unit. Hence, the control unit is preferably configured to receive the series of captured images from the camera.

With regard to the series of images, the series of images preferably comprises several images, also called still pictures, wherein each image—i.e. the still picture—represents the object on the carrier being transported by the conveyor system at a specific time. Each image of the series of image preferably comprises pixel image data and/or digital image data. Further preferably the image is a two-dimensional representation of the captured scene, i.e. the object on the carrier being transported by the conveyor system. In other words, the image preferably does not comprise three-dimensional image data, with distance information to the object, but two-dimensional image data. This has the advantage that the method and the system are easy to implement and inexpensive.

With regard to the camera, the camera is preferably arranged with regard to the conveyor system such that a field of view of the camera covers a section of the conveyor system, such that the captured series of images represents the object on the carrier being transported by the conveyor system. Further preferably the camera is arranged such that an image plane of the series of images captured by the camera is preferably not perpendicular to the transport direction of the conveyor system at the location where the series of images is captured. With regard to the method for determining the stability of the object, this preferably also means that an image plane of the received series of images is preferably not perpendicular to the transport direction of the conveyor system.

Further preferably the camera is arranged such that the image plane of the series of images captured by the camera is preferably parallel±45 degrees to a transport direction of the conveyor system at the location where the series of images is captured. Further preferably the camera is arranged such that the image plane of the series of images captured by the camera is preferably parallel±45 degrees to a plane defined by the carrier at the location where the series of images is captured. This arrangement has the advantage that on the captured series of images the object essentially moves within the image plane, which simplifies the determination of the moving direction of the object.

In the next step of the method, the moving direction of the object in the received series of images is determined. Preferably, the moving direction of the object is a two-dimensional vector indicating the direction of movement of the object with respect to an image coordinate system. The image coordinate system preferably spans the image plane.

In a further step of the method the stability of the object is determined by comparing the determined moving direction of the object to the transport direction of the conveyor system. As unstable objects tend to roll, slide and/or shuffle the stability of the object can be determined by comparing the determined moving direction of the object to the transport direction of the conveyor system. Furthermore, the movement of the carrier preferably de-fines the transport direction of the conveyor system. In other words, the transport direction of the conveyor system at a specific location preferably corresponds to the direction of a three-dimensional vector describing the movement of the carrier at the specific location. The method and the system have the advantage that they is inexpensive, easy to implement and allow for fast determination of the stability of the object. Further preferably the method does not make use of a machine learning algorithm and/or a neural network, but is preferably deterministic. This has the advantage that the method and system do not need a high-performance control unit, for performing the method.

According to another preferred embodiment of the invention, the step of determining the moving direction of the object in the received series of images comprises determining the optical flow in the received series of images, preferably by the Lucas-Kanade method. The optical flow is the pattern of apparent motion of objects, surfaces, and/or edges in the series of images caused by the relative motion between the camera and the captured scene, i.e. the object on the carrier being transported by the conveyor system. Preferably the Lu-cas-Kanade method is used to determine the optical flow, which is a differential method for optical flow estimation. The Lucas-Kanade method assumes that the optical flow is essentially constant in a local neighborhood of the pixel under consideration, and solves the basic optical flow equations for all the pixels in that neighborhood, by the least-squares-criterion. It hast the advantage that it is less sensitive to image noise.

According to another preferred embodiment of the invention, the step of determining the moving direction of the object in the received series of images comprises following an object related tracking point in the series of images, wherein the object related tracking point is determined by considering a change of brightness between two consecutive images of the series of images. In other words, the direction of movement of the object is preferably determined by analyzing the optical flow for one or several object related tracking points.

As the object related tracking point is preferably determined by considering a change of brightness between two consecutive images of the series of images, tracking points that are not object related but are recognized as tracking points due to a change in light or other external causes like vibration, need to be distinguished from object related tracking points. In order to do so and according to another preferred embodiment of the invention, the step of determining the moving direction of the object in the received series of images comprises the steps of

- generating a differential image between two consecutive images of the received series of images,
- generating a black and white representation of the generated differential image,
- determining contours in the generated black and white representation, and
- determining the moving direction of the object within an area defined by the determined contours.

In other words, the exclusion of not object related tracking points is preferably accom-plished by first determining all changed pixels between two consecutive images and turning this differential image into a black and white frame. In this frame the white pixels are preferably the changed pixels, that are indicative of movement between the two consecutive images and the black pixels are the static pixels. Alternatively, the black pixels can be the changed pixels between the two consecutive images and the white pixels can be the static pixels. The generated black and white representation is afterwards preferably used for determining contours. By determining the moving direction of the object within the area defined by the determined contours, not object related tracking points are thus excluded in a simple way.

With regard to the carrier of the conveyor system, the carrier can have any color or can also have a pattern. However, the carrier preferably has a uniform surface, and further preferably does not have a pattern and/or is unicolor. This has the advantage that determining the moving direction of the object, and/or the exclusion of not object related tracking points is simplified and less computing power is needed to determine the moving direction.

According to another preferred embodiment of the invention the method comprises the step of determining the transport direction of the conveyor system. Preferably determining the transport direction of the conveyor system comprises determining the direction of movement of the carrier. Further preferably the direction of movement of the carrier is determined at a location of the conveyor system that corresponds to the location represented by the series of images.

In this regard and according to another preferred embodiment of the invention, the transport direction of the conveyor system is determined based on the received series of images representing the object on the carrier being transported by the conveyor system. In other words, in this embodiment, the images are not only used to determining the moving direction of the object in the received series of images, but also to determining transport direction of the conveyor system, and preferably the moving direction of the carrier.

Alternatively and/or additionally and according to another preferred embodiment of the invention the transport direction of the conveyor system is determined based on a predetermined configurational setup. In this regard, as the arrangement of the camera with respect to the conveyor system determines the projection of the transport direction into the image plane, the predetermine configurational setup comprises the arrangement of the camera towards the conveyor system. For example, the system for determining the stability of the object transported on the conveyor system is preferably configured such that the projection of the transport direction into the image plane corresponds in the series of images to a direction of an axis of the image coordinate system. For example, the system can be configured such that the camera captures a series of images representing the object on the carrier being transported by the conveyor system along the x-direction of the captured image. In other words, in this example in the captured image series the carrier moves from the left to the right in the image.

According to another preferred embodiment of the invention, the step of comparing the determined moving direction of the object to the transport direction of the conveyor system comprises determining a two-dimensional projection of the transport direction of the conveyor system into the image plane of the received series of images and comparing the two-dimensional projection of the transport direction to the determined moving direction of the object. This simplifies comparing of the determined moving direction to the transport direction, as a two-dimensional vector is compared with another two-dimensional vector.

According to another preferred embodiment of the invention, the step of comparing the determined moving direction of the object to the transport direction of the conveyor system comprises comparing a coordinate of the tracking point with respect to the image coordinate system in one image of the series of images to the coordinate of the tracking point with respect to the image coordinate system in a consecutive image of the series of images. This is a particular simple way and preferred in cases where the system is configured such that the projection of the transport direction into the image plane corresponds in the series of images to a direction of an axis of the image coordinate system.

According to a preferred embodiment of the invention, a method is provided wherein the object is determined to be unstable, if the moving direction of the object for a predetermined number of images is contrary to the transport direction of the conveyor system. In other words, if the comparison between the moving direction of the object and the transport direction of the conveyor system—and more preferably the comparison between the moving direction of the object and the two-dimensional projection of the transport direction of the conveyor system into the image plane—shows for a predetermined number of images, that the object moves relative to the carrier of the conveyor system and that the relative movement has a component contrary to the projection of the transport direction into the image plane, then the object is preferably determined to be unstable.

On the other hand, and according to a further preferred embodiment of the invention, a method is provided wherein the object is determined to be stable, if the moving direction of the object for a predetermined number of images is not contrary to the transport direction of the conveyor system. In other words, if the comparison between the moving direction of the object and the transport direction of the conveyor system—and more preferably the comparison between the moving direction of the object and the two-dimensional projection of the transport direction of the conveyor system into the image plane—shows for a predetermined number of images, that the object does not move relative to the carrier or that the objects moves relative to the carrier and that the relative movement has no component contrary to the projection of the transport direction into the image plane, then the object is preferably determined to be stable. In other words, in case the object moves relative to the carrier into the same direction as the transport direction and/or in a direction perpendicular to the transport direction, then the object is preferably determined to be stable.

The predetermined number of images can be used to adjust the sensitivity of the method for determining unstable objects. In other words, the predetermined number can be chosen according to the current circumstances, for example by taking the type of object that is transported by the conveyor system, the type of conveyor system and/or a transport velocity of the conveyor system into account. Preferably, the predetermined number of images is at least five, more preferably the predetermined number is 10.

According to another preferred embodiment of the invention, the method comprises the step of generating a control command in case an object is determined to be unstable. The control command can for example be used to alert an employee to the unstable object, such that countermeasures can be taken, by generating an optical and/or acoustical signal. Alternatively or additionally, the control signal can be used to control the conveyor system, for example to stop the movement of the carrier.

In this regard and according to another preferred embodiment of the invention, the method comprises the step of ejecting an object that has been determined to be unstable from the carrier by the conveyor system. In this embodiment, the control command is preferably used to automatically eject the unstable object from the carrier by the conveyor system. This has the advantage that the occurrence of jamming is effectively decreased, as unstable objects are ejected from the carrier. Preferably the conveyor system is communicationally connected to the control unit and configured to receive the control command from the control unit.

According to another preferred embodiment of the invention, the method comprises the step of capturing a series of images representing the object on the carrier being transported by the conveyor system, by the camera, and sending the captured images to the control unit. Preferably the series of images are captured such that in the captured series of images the object on the carrier is being transported along an axis of the image coordinate system, and further preferably along the x-axis. This has the advantage that the step of determining the transport direction of the conveyor system and/or the step of determining the stability of the object by comparing the determined moving direction of the object to the transport direction of the conveyor system is simplified.

Further features and advantages of the method for determining the stability of the object being transported on the conveyor system are directly and unambiguously derived by the person skilled in the art from the description of the system for determining the stability of the object being transported on the conveyor system.

As already mentioned, the invention is also directed to the system for determining the stability of the object being transported on the conveyor system comprising the control unit and the camera, wherein the camera is communicationally connected to the control unit, configured to capture the series of images representing the object on the carrier being transported by the conveyor system, and configured to send the captured images to the control unit. Preferably the camera is configured as a 2D vision camera system and/or the control unit is configured as computer system.

According to another preferred embodiment of the invention the system comprising the conveyor system, wherein the conveyor system comprises the carrier configured to transport the object in the transport direction of the conveyor system and wherein the camera is arranged above the carrier. In other words, the camera looks down onto the carrier of the conveyor system. The arrangement of the camera above the carrier simplifies the capturing of the series of images representing the object on the carrier being transported by the conveyor system.

According to another preferred embodiment of the invention, the system comprises a light source, arranged such that the object on the carrier being transpired by the conveyor system is illuminable by the light source. As the method for determining the stability of the object preferably analyzes the brightness of the pixels, the accuracy of the method can be enhanced by the light source.

According to another preferred embodiment of the invention, the conveyor system comprises a first section and a second section, wherein a) a transport velocity of the conveyor system in the first section is different to the transport velocity of the conveyor system in the second section, and/or b) an inclination of the conveyor system in the first section is different to the inclination of the conveyor system in the second section, and wherein the camera is arranged above a transition between the first section and the second section.

The stability of the object is preferably determined at locations of the conveyor system, where an acceleration or deceleration of the object on the carrier takes place, as at these locations also objects that might appear to be stable can be recognized as unstable objects, as the objects encounter acceleration or deceleration by the conveyor system. Preferably, the camera is arranged above the transition between the first section and the second section, wherein features a) and b) are realized. Further preferably the inclination of the carrier of the conveyor system differs in the first section from the inclination of the carrier in the second section and/or the speed of the carrier of the conveyor system differs in the first section from the speed of the carrier in the second section. Further preferably the camera is arranged above the transition between the first section and the second section such that the field of view of the camera covers the first section and the second section at least partially.

According to another preferred embodiment of the invention, a frame per second of the camera, an angle of view of the camera, a distance of the camera to the conveyor system, and a transport velocity of the conveyor system are matched to each other such that the series of images of the object transported by the conveyor system comprises at least three still pictures of the same object being transported on the carrier. In other words, the method for determining the stability of the object is very efficient as already three still pictures of the same objects are sufficient to determin if the object is stable or not.

Further preferably the frames per second of the camera is at least 30. This simplifies the step of tracking points in the series of image for typical conveyor system speeds as the dif-ference between two consecutive images is low enough. Furthermore, the camera preferably has a resolution of at least 1 Megapixel.

With regard to the conveyor system and according to another preferred embodiment of the invention, the conveyor system is configured to eject an object that has been determined to be unstable from the carrier.

Further technical features and advantages of the system for determining the stability of the object being transported on the conveyor system are directly and unambiguously derived by the person skilled in the art from the method for determining the stability of the object being transported on the conveyor system as described before.

SHORT DESCRIPTION OF THE DRAWINGS

The invention will be explained in more detail below with reference to the attached drawings by way of preferred embodiments.

Figure 2:
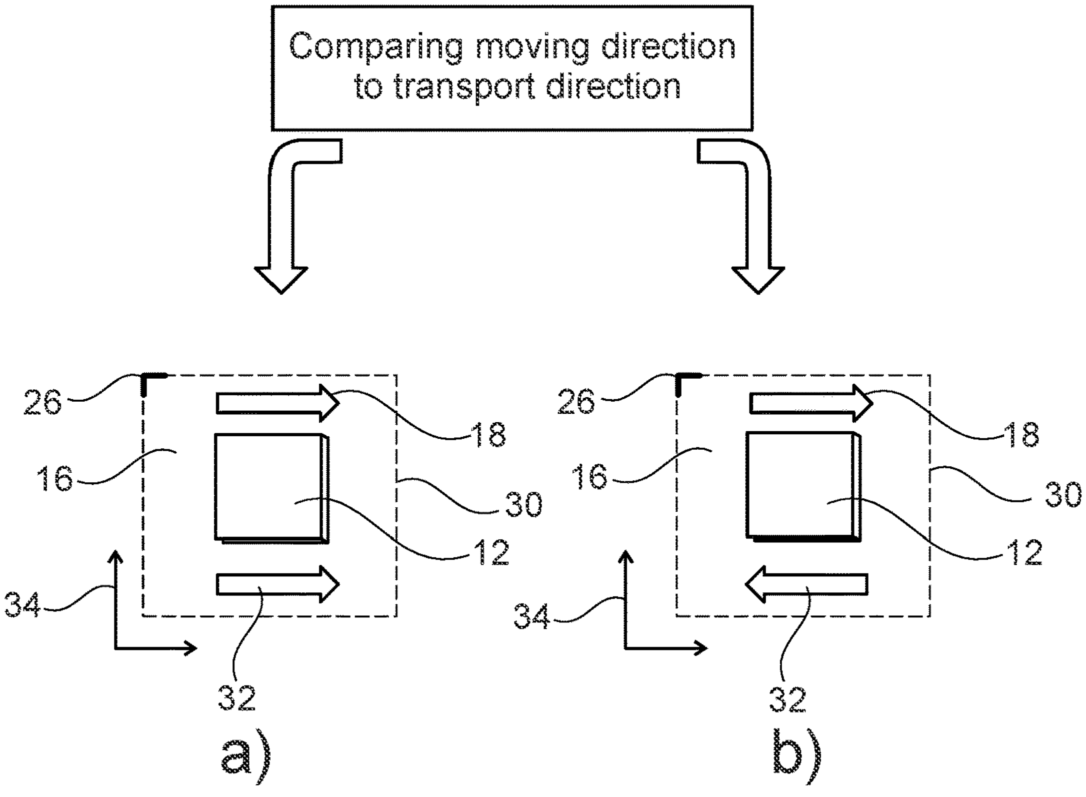
Figure 6:
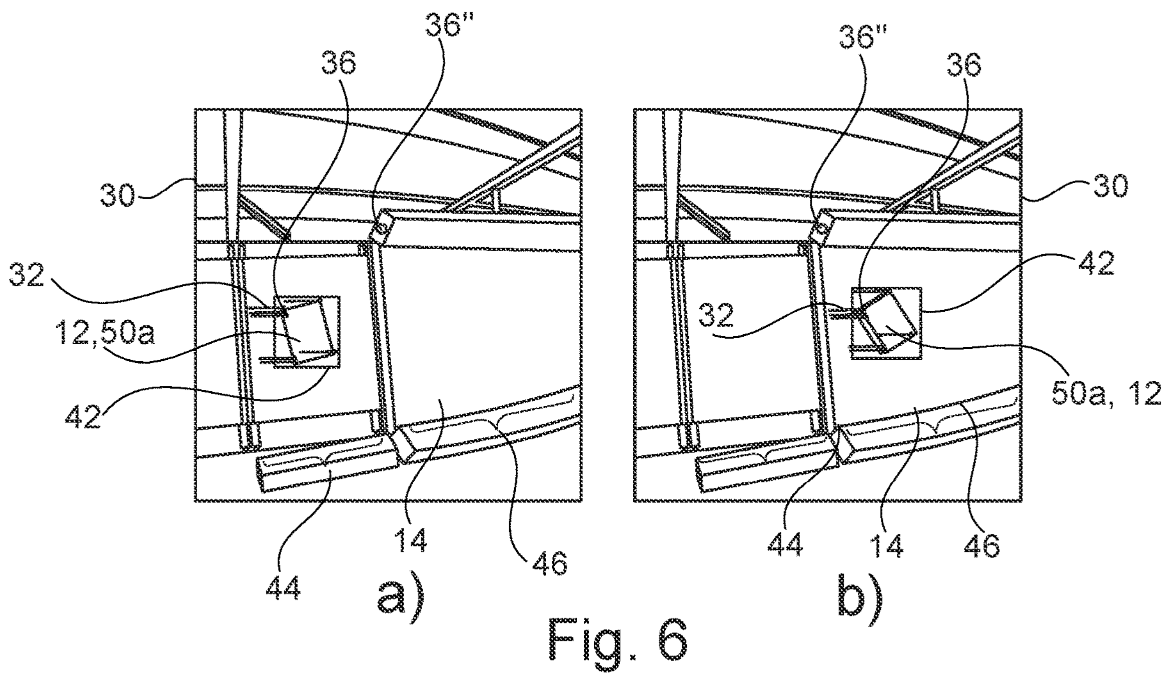

In the drawings:

FIG. 1 shows a schematic illustration of a system for determining the stability of an object transported on a conveyor system, according to a preferred embodiment of the invention, FIG. 2 shows a schematic illustration of a step of a method for determining the stability of an object being transported on the conveyor system performed by a control unit of the system of FIG. 1, FIG. 3 shows a schematic illustration of objects being transported on a conveyor system that have been determined to be unstable by the system of FIG. 1, FIG. 4 shows a schematic illustration of another step of the method for determining the stability of an object being transported on the conveyor system, performed by the control unit of the system of FIG. 1, FIG. 5 shows a schematic illustration of a system for determining the stability of an object transported on a conveyor system, according to another preferred embodiment of the invention, FIG. 6, 7 show schematic illustrations of still pictures of a series of images received by a control unit performing a method for determining the stability of an object transported on a conveyor system, according to another preferred embodiment of the invention.

DETAILED DESCRIPTION OF THE EMBODIMENTS

FIG. 1 shows a schematic illustration of a preferred embodiment of a system 10 for determining the stability of an object 12 transported on a conveyor system 14.

The conveyor system 14 comprises a carrier 16 configured to transport the object 12 in a transport direction 18 of the conveyor system 14. In this embodiment, the conveyor system 14 is configured as belt conveyor system, and the object 12 is transported by movement of the conveyor belt 16 along the transport direction 18. The object 12 is in this embodiment a packaging container 12.

The system 10 comprises a control unit 20 and a camera 22, wherein the camera 22 is communicationally connected to the control unit 20. Furthermore, the camera 22—in this embodiment a 2D vision camera 22—is configured to capture a series of images representing the object 12 on the carrier 16 being transported by the conveyor system 14, and configured to send the captured images to the control unit 20.

As can be seen in FIG. 1, the camera 22 is arranged such that a field of view 24 of the camera 22 covers a section of the conveyor system 14. Hence, the series of images captured by the camera represents the object 12 on the carrier 16 being transported by the conveyor system 14. Furthermore, the camera 22 is arranged above the carrier 16, such that an image plane 26 of the series of images captured by the camera 22 is parallel to a plane 28 defined by the carrier 16.

The control unit 20 of the system 10 is configured to perform a method for determining the stability of the object

12 being transported on the conveyor system 14, which will be explained in the following with reference to FIGS. 1 and 2:

In a first step of the method, the control unit 20 receives form the camera 22 a series of images representing the object 12 on the carrier 16 being transported by the conveyor system 14. The series of images comprises several images 30, also called still pictures 30, wherein each still picture 30 represents the object 12 on the carrier 16 being transported by the conveyor system 14 at a specific time. FIG. 2 shows a schematic illustration of a step of the method performed by the control unit 20 and shows two exemplary still pictures 30. Each still picture 30 comprises pixel image data.

In a further step of the method a moving direction 32 of the object 12 in the received series of images is determined. In this embodiment the moving direction 32 of the object 12 is a two-dimensional vector indicating the direction of movement of the object 12 with respect to an image coordinate system 34 of the series of images. As already mentioned, FIG. 2 shows two exemplary still pictures 30 received by the control unit of FIG. 1. As can be seen the image plane 26 and the image coordinate system 34 lie within the drawing layer of FIG. 2.

In a further step of the method the stability of the object is determined by comparing the determined moving direction 32 of the object 12 to the transport direction 18 of the conveyor system 14. This step is illustrated in FIG. 2, from which it can be seen that the object 12 is determined to be unstable, if the moving direction 32 of the object 12 is contrary to the transport direction 18 of the conveyor system 14 (see FIG. 2*b*) and the object 12 is determined to be stable, if the moving direction 32 of the object 12 is not contrary to the transport direction 18 of the conveyor system 14 (see FIG. 2*a*).

FIG. 3 shows a schematic illustration of objects 12 being transported on the conveyor system 14 of FIG. 1, that have been determined to be unstable by the system 10 of FIG. 1. In this embodiment the step of determining the moving direction 32 of the object 12 in the received series of images comprises determining an optical flow in the received series of images by the Lucas-Kanade method and further following tracking points 36 in the series of images by considering a change of brightness in pixels between two consecutive images of the series of images. In FIG. 3, the tracking points 36, 36' are indicated on the object 12, wherein tracking point 36' indicates a later point in time than tracking point 36. When unstable objects 12 roll or slide on the carrier 16, the moving direction 32 of the object 12 is contrary to the transport direction 18 as can be seen by following the tracking points 36, 36'.

FIG. 4 shows a schematic illustration of another step of the method for determining the stability of the object 12 being transported on the conveyor system 14, performed by the control unit 20 of the system 10 of FIG. 1. FIG. 4 schematically illustrates the step of distinguishing not object related tracking points 36" from object related tracking points 36, 36'. Not object related tracking points 36" are points 36" that are not related to the object 12 on the carrier 16, but points 36" that are tracked due to a change in light or other external causes like vibration. In order to distinguish between object related tracking points 36, 36' and not object related tracking points 36", a differential image 38 between two consecutive images of the received series of images is generated. Afterwards a black and white representation 40 of the generated differential image 38 is generated. In this frame the white pixels are the changed pixels, that are indicative of movement between the two consecutive images and the black pixels are the static pixels. The black and white representation 40 is used for determining contours. Subsequently the moving direction 32 of the object 12 within an area 42 defined by the determined contours is determined, thereby ex-cluding not object related tracking points 36".

FIG. 5 shows a schematic illustration of a system 10 for determining the stability of the object 12 transported on the conveyor system 14, according to another preferred embodiment of the invention. In this embodiment the conveyor system 14 comprises a first section 44 and a second section 46, wherein an inclination 48 of the conveyor system 14—in this embodiment the inclination 48 of the carrier 16—in the first section 44 is different to the inclination 48 in the second section 46. The camera 22 is arranged above the transition between the first section 44 and the second section 46.

Figure 7:
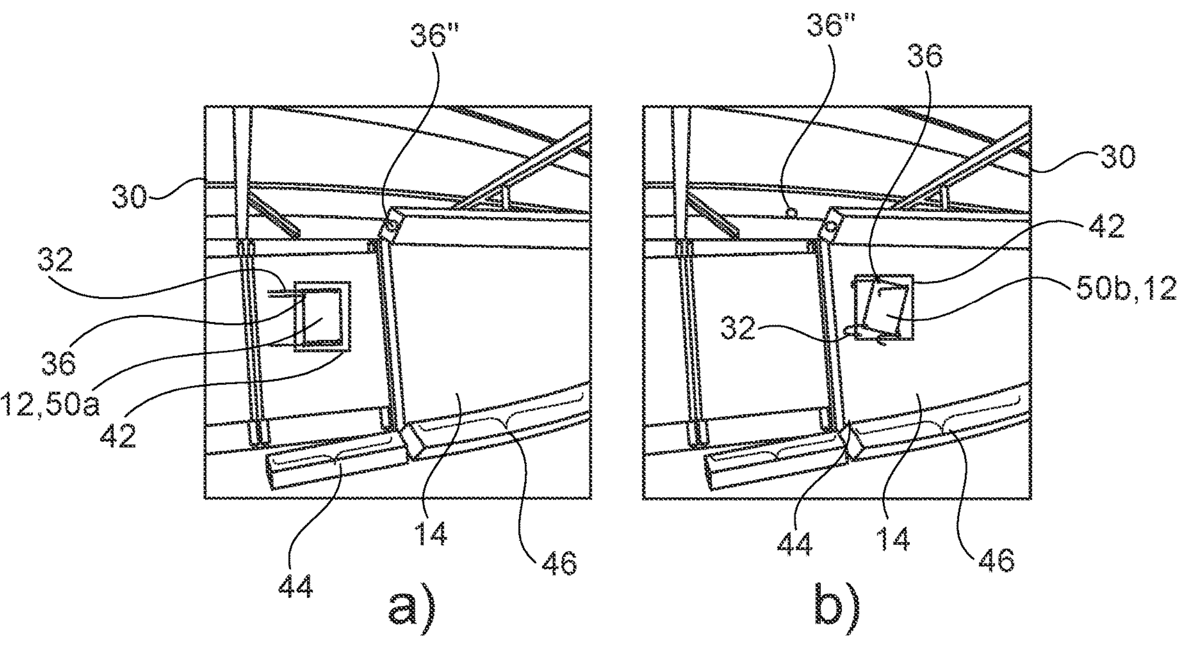

FIGS. 6 and 7 both show schematic illustrations of still pictures 30 of a series of images received by the control unit 20 performing the method for determining the stability of the object 12 transported on a conveyor system 14, according to another preferred embodiment of the invention. FIG. 6 shows two still pictures 30 of a series of images, wherein the still picture 30 in FIGS. 6*a* and 7*a* are taken prior in time than the respective still picture 30 in FIGS. 6*b* and 7*b*.

As can be seen in FIG. 6, the object 12 is transported from the first section 44 to the second section 46 of the conveyor system 14. The control unit 20, preforming the method for determining the stability of the object 12 transported on a conveyor system 14 has determined that the object 12 is a stable object 12, as the direction of movement 32 of the object is not contrary to the transport direction 18 of the conveyor system 14.

However, with regard to FIG. 7, where the object 12 is also transported from the first section 44 to the second section 46 of the conveyor system 14, the control unit 20, preforming the method for determining the stability of the object 12 transported on a conveyor system 14 has determined that the object 12 is an unstable object 12. As can be seen on FIG. 7, as the object 12 presents in FIG. 7*a* a first outer face 50*a* upwards and in FIG. 7*b* a second outer face 50*b* upwards, the object 12 has rolled over. During this rolling process the object 12 has had a direction of movement 32 contrary to the transport direction 18 of the conveyor system 14, and was thus detected as unstable object 12 by the control unit 20.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosed, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage. Any reference signs in the claims should not be construed as limiting scope.

LIST OF REFERENCE SIGNS

System 10
Object, packaging container 12
Conveyor system 14
Carrier, conveyor belt 16
Transport direction 18

Control unit 20
Camera 22
Field of view 24
Image plane 26
Plane defined by carrier 28
Still picture 30
Moving direction 32
Image coordinate system 34
Object related tracking point 36, 36'
Not object related tracking point 36"
Differential image 38
Black and white representation 40
Area defined by contours 42
First section 44
Second section 46
Inclination 48
First outer face 50*a*
Second outer face 50*b*

The invention claimed is:

1. Computer implemented method for determining the stability of an object being transported on a conveyor system, wherein the conveyor system comprises a carrier configured to transport the object in a transport direction of the conveyor system, comprising the steps of:

receiving a series of images representing the object on the carrier being transported by the conveyor system;

determining an object moving direction of the object in the received series of images; and determining the stability of the object by comparing the determined object moving direction of the object to the transport direction of the conveyor system, wherein, when the object is moving in the object moving direction and the object moving direction for a predetermined number of images is different to the transport direction of the conveyor system, the object is determined to be unstable, and wherein, when the object moving direction for a predetermined number of images is not different to the transport direction of the conveyor system, the object is determined to be stable.

2. Method according to claim 1, wherein the step of determining the object moving direction of the object in the received series of images comprises:

a) determining the optical flow in the received series of images, preferably by the Lucas-Kanade method and/or b) following an object related tracking point in the series of images, wherein the object related tracking point is determined by considering a change of brightness between two consecutive images of the series of images.

3. Method according to claim 1, wherein the step of determining the object moving direction of the object in the received series of images comprises the steps of:

generating a differential image between two consecutive images of the received series of images;

generating a black and white representation of the generated differential image;

determining contours in the generated black and white representation; and determining the object moving direction of the object within an area defined by the determined contours.

4. Method according to claim 1, wherein the method comprises the step of determining the transport direction of the conveyor system, wherein a) the transport direction of the conveyor system is determined based on the received series of images representing the object on the carrier being transported by the conveyor system and/or b) the transport direction of the conveyor system is determined based on a predetermined configurational setup.

5. Method according to claim 1, wherein the step of comparing the determined object moving direction of the object to the transport direction of the conveyor system comprises:

a) determining a two-dimensional projection of the transport direction of the conveyor system into an image plane of the received series of images and comparing the two-dimensional projection of the transport direction to the determined object moving direction of the object, and/or b) comparing a coordinate of an object related tracking point with respect to an image coordinate system in one image of the series of images to the coordinate of the object related tracking point with respect to the image coordinate system in a consecutive image of the series of images.

6. Method according to claim 1, wherein the method comprises the step of generating a control command in case an object is determined to be unstable.

7. Method according to claim 1, wherein the method comprises the step of ejecting an object that has been determined to be unstable from the carrier by the conveyor system.

8. Method according to claim 1, wherein the method comprises the step of capturing a series of images representing the object on the carrier being transported by the conveyor system by a camera, and sending the captured images to a control unit.

9. Control unit configured to perform the method according to claim 1.

10. System for determining the stability of an object being transported on a conveyor system comprising the control unit according to claim 9 and a camera, wherein the camera is communicationally connected to the control unit, configured to capture a series of images representing the object on the carrier being transported by the conveyor system, and configured to send the captured images to the control unit.

11. System according to claim 10 comprising a conveyor system, wherein the conveyor system comprises a carrier configured to transport the object in a transport direction of the conveyor system and wherein the camera is arranged above the carrier.

12. System according to claim 11, wherein the conveyor system is configured to eject an object that has been determined to be unstable from the carrier.

13. System according to claim 10, wherein the conveyor system comprises a first section and a second section, wherein a) a transport velocity of the conveyor system in the first section is different to the transport velocity of the conveyor system in the second section, and/or b) an inclination of the conveyor system in the first section is different to the inclination of the conveyor system in the second section, and wherein the camera is arranged above a transition between the first section and the second section.

14. System according to claim 10, wherein a frame per second of the camera, an angle of view of the camera, a distance of the camera to the conveyor system, and a transport velocity of the conveyor system are matched to each other such that the series of images of the object transported by the conveyor system comprises at least three still pictures of the same object being transported on the carrier.

* * * * *